(12) United States Patent
Takahashi

(10) Patent No.: US 8,587,731 B2
(45) Date of Patent: Nov. 19, 2013

(54) PROJECTION DISPLAY DEVICE AND CAPTION DISPLAY METHOD

(75) Inventor: Mitsuru Takahashi, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 268 days.

(21) Appl. No.: 12/735,079

(22) PCT Filed: Oct. 17, 2008

(86) PCT No.: PCT/JP2008/068852
§ 371 (c)(1),
(2), (4) Date: Jun. 14, 2010

(87) PCT Pub. No.: WO2009/093359
PCT Pub. Date: Jul. 30, 2009

(65) Prior Publication Data
US 2010/0253862 A1    Oct. 7, 2010

(30) Foreign Application Priority Data
Jan. 25, 2008    (JP) .................. 2008-014798

(51) Int. Cl.
| H04N 7/00 | (2011.01) |
| H04N 11/00 | (2006.01) |
| H04N 5/445 | (2011.01) |
| H04N 9/74 | (2006.01) |
| H04N 3/22 | (2006.01) |
| H04N 3/26 | (2006.01) |
| G03B 21/14 | (2006.01) |

(52) U.S. Cl.
USPC ............ 348/745; 348/468; 348/563; 348/581; 348/589; 353/70

(58) Field of Classification Search
USPC ......... 348/466, 468, 473, 555, 556, 558, 563, 348/564, 589
See application file for complete search history.

(56) References Cited

U.S. PATENT DOCUMENTS 5,212,477 A * 5/1993 Indekeu et al. ............... 340/7.55
5,546,131 A * 8/1996 Terry ............................ 348/564
(Continued)

FOREIGN PATENT DOCUMENTS

| JP | 5-161095 A | 6/1993 |
| JP | 2000-59720 A | 2/2000 |

(Continued)

OTHER PUBLICATIONS

Japanese Office Action dated Jun. 11, 2013 with partial English translation thereof.

*Primary Examiner* — Brian Yenke
(74) *Attorney, Agent, or Firm* — McGinn Intellectual Property Law Group, PLLC

(57) ABSTRACT

The present invention provides a projection display device configured to solve a caption dropout problem. CPU 3 determines a correction amount required to correct an image signal for distortion. Scaler 4 corrects the image signal for distortion based on the correction amount. Caption signal processing circuit 5 adjusts the display content of a caption signal based on the correction amount in such a manner that the entire caption indicated by the caption signal is displayed. Display image generation circuit 6 synthesizes the caption signal with the display content thereof adjusted by caption signal processing circuit 5, with the image signal corrected by scaler 4. Projection section 7 projects the synthesized image signal.

18 Claims, 4 Drawing Sheets

(56) References Cited

U.S. PATENT DOCUMENTS

| | | | |
|---|---|---|---|
| 5,561,471 A * | 10/1996 | Kim | 348/565 |
| 5,675,389 A * | 10/1997 | Oda | 348/468 |
| 5,936,545 A * | 8/1999 | Tsumura | 340/7.55 |
| 6,097,442 A * | 8/2000 | Rumreich et al. | 348/563 |
| 6,144,389 A * | 11/2000 | Toshimoto et al. | 345/472 |
| 6,229,519 B1 * | 5/2001 | Narusawa | 345/660 |
| 6,452,597 B1 * | 9/2002 | Goldberg et al. | 345/472 |
| 6,539,117 B2 * | 3/2003 | Carau, Sr. | 382/229 |
| 6,707,504 B2 * | 3/2004 | Chung | 348/569 |
| 6,843,569 B2 * | 1/2005 | Hirao et al. | 353/70 |
| 6,845,488 B1 * | 1/2005 | Shim et al. | 715/815 |
| 6,977,690 B2 * | 12/2005 | Gomikawa | 348/468 |
| 7,165,264 B1 * | 1/2007 | Westrick | 725/40 |
| 7,224,401 B2 * | 5/2007 | Ackley et al. | 348/556 |
| 7,450,177 B2 * | 11/2008 | Lee et al. | 348/468 |
| 7,511,761 B2 * | 3/2009 | Lynch | 348/468 |
| 7,557,865 B2 * | 7/2009 | Minami | 348/589 |
| 7,705,862 B1 * | 4/2010 | Teng | 345/647 |
| 7,883,221 B2 * | 2/2011 | Nozaki et al. | 353/122 |
| 7,911,536 B2 * | 3/2011 | Dunton | 348/556 |
| 7,978,267 B2 * | 7/2011 | Kwon et al. | 348/468 |
| 8,004,506 B2 * | 8/2011 | Suzuki | 345/204 |
| 8,022,968 B2 * | 9/2011 | Yoo et al. | 345/635 |
| 8,125,567 B2 * | 2/2012 | Park | 348/564 |
| 8,159,615 B2 * | 4/2012 | Berbecel | 348/598 |
| 2003/0020834 A1 * | 1/2003 | Gomikawa | 348/589 |
| 2003/0025833 A1 * | 2/2003 | Mountain | 348/468 |
| 2005/0041146 A1 * | 2/2005 | Lee et al. | 348/468 |
| 2008/0148313 A1 * | 6/2008 | Ozawa et al. | 725/39 |
| 2009/0027557 A1 * | 1/2009 | Berbecel | 348/589 |
| 2009/0225235 A1 * | 9/2009 | Fujisaki et al. | 348/745 |
| 2009/0273711 A1 * | 11/2009 | Chapdelaine et al. | 348/465 |
| 2010/0232762 A1 * | 9/2010 | Kendall et al. | 386/95 |

FOREIGN PATENT DOCUMENTS

| | | |
|---|---|---|
| JP | 2002-341438 A | 11/2002 |
| JP | 2005-323389(A) | 11/2005 |
| JP | 2006-211488 A | 8/2006 |
| JP | 2006-295361(A) | 10/2006 |
| JP | 2007-193204 A | 8/2007 |

* cited by examiner

31 CAPTION (NORMAL DISPLAY)

ABCDEFGHIJKLMNOPQRSTUVWXYZ

32 CAPTION (DISPLAYED IN A PLURALITY OF LINES)

ABCDEFGHIJKLM

NOPQRSTUVWXYZ

33 CAPTION (SCROLLING DISPLAY)

···CDEFGHIJKLMNO···

SCROLLING DIRECTION

PROJECTION DISPLAY DEVICE AND CAPTION DISPLAY METHOD

TECHNICAL FIELD

The present invention relates to a projection display device and a caption display method.

BACKGROUND ART

In projection display devices such as projectors, trapezoidal distortion may occur in projected images as a result of the relative relationship between the projecting optical axis of the projection display device and the screen. Thus, the projection display device normally includes means for correcting trapezoidal distortions.

Furthermore, the projection display device may synthesize an OSD (On Screen Display) image with a projected image corrected for trapezoidal distortion to display the synthesized image. In this case, the OSD image may be misaligned with the projected image corrected for trapezoidal distortion and spread out of the screen.

A projection display device described in Patent Document 1 corresponds to a technique for enabling the OSD image to be displayed without being misaligned with the projected image corrected for trapezoidal distortion.

This projection display device acquires the coordinates (uncorrected coordinates) of a reference point on the projected image uncorrected for trapezoidal distortion and the coordinates (corrected coordinates) of the reference point on the projected image corrected for trapezoidal distortion. The projection display device moves the display range of the OSD image based on the difference between the uncorrected coordinates and the corrected coordinates.

The image distortion is corrected in such a manner that the image is reduced taking into account the area of screen. The invention described in Patent Document 1 only changes the position of the OSD image and not the size of the OSD image. Thus, the projection display device described in Patent Document 1 determines whether or not the OSD image is located within the moved display range. When the OSD image fails to be located within the moved display range, the projection display device deletes some of OSD menu items in accordance with pre-registered priorities before displaying the OSD image.

This enables the OSD image to be displayed without being misaligned with the projected image corrected for trapezoidal distortion.

Patent Document 1: JP2007-193204A

DISCLOSURE OF THE INVENTION

Problems to be Solved by the Invention

In general, in the projection display device, besides the OSD image, a caption may be synthesized with the projected image. In this case, when synthesized with the projected image corrected for trapezoidal distortion, the caption may be misaligned with the projected image similarly to the OSD image.

In this case, if the method carried out on the OSD image by the projection display device described in Patent Document 1 is applied to the caption to perform the deletion so that the caption can be displayed without being misaligned with the projected image, the caption may disadvantageously partly drop out and fail to fulfill its function. The caption can be placed within the display range by reducing the size of the characters in the caption. However, characters having a reduced size may be difficult to see, thus preventing the caption from fulfilling its function.

Furthermore, the shape of the distortion of the projected image resulting from the relative relationship between the projecting optical axis of the projection display device and the screen is not limited to the trapezoid but is generally a distorted rectangle. The above-described problem may occur even if this general distortion is corrected.

An object of the present invention is to provide a projection display device and a caption display method both of which allow the above-described caption dropout problem to be solved.

Means for Solving the Problems

A projection display device according to the present invention includes signal input means, control means, correction means, processing means, synthesis means, and projection means.

The signal input means receives an image signal and a caption signal. The control means determines a correction amount required to correct the image signal for distortion. The correction means corrects the image signal for distortion based on the correction amount determined by the control means. The processing means adjusts the display content of the caption signal based on the correction amount determined by the control means in such a manner that the entire caption indicated by the caption signal is displayed. The synthesis means synthesizes the caption signal with the display content thereof adjusted by the processing means, with the image signal corrected by the correction means. The projection means projects an image corresponding to the image signal synthesized by the synthesis means.

Furthermore, a caption display method according to the present invention includes receiving an image signal and a caption signal, determining the correction amount required to correct the image signal for distortion, correcting the image signal for distortion based on the correction amount determined by the control means, adjusting the display content of the caption signal based on the determined correction amount in such a manner that the entire caption indicated by the caption signal is displayed, synthesizing the caption signal with the display content thereof adjusted, with the corrected image signal, and projecting an image corresponding to the synthesized image signal.

Advantage of the Invention

According to the present invention, the same correction amount is used to correct both the projected image and the caption for distortion. Thus, the caption is reliably placed inside the projected image and can thus be displayed without any dropout.

BEST MODE FOR CARRYING OUT THE INVENTION

Exemplary embodiments of the present invention will be described below with reference to the drawings.

Figure 1:
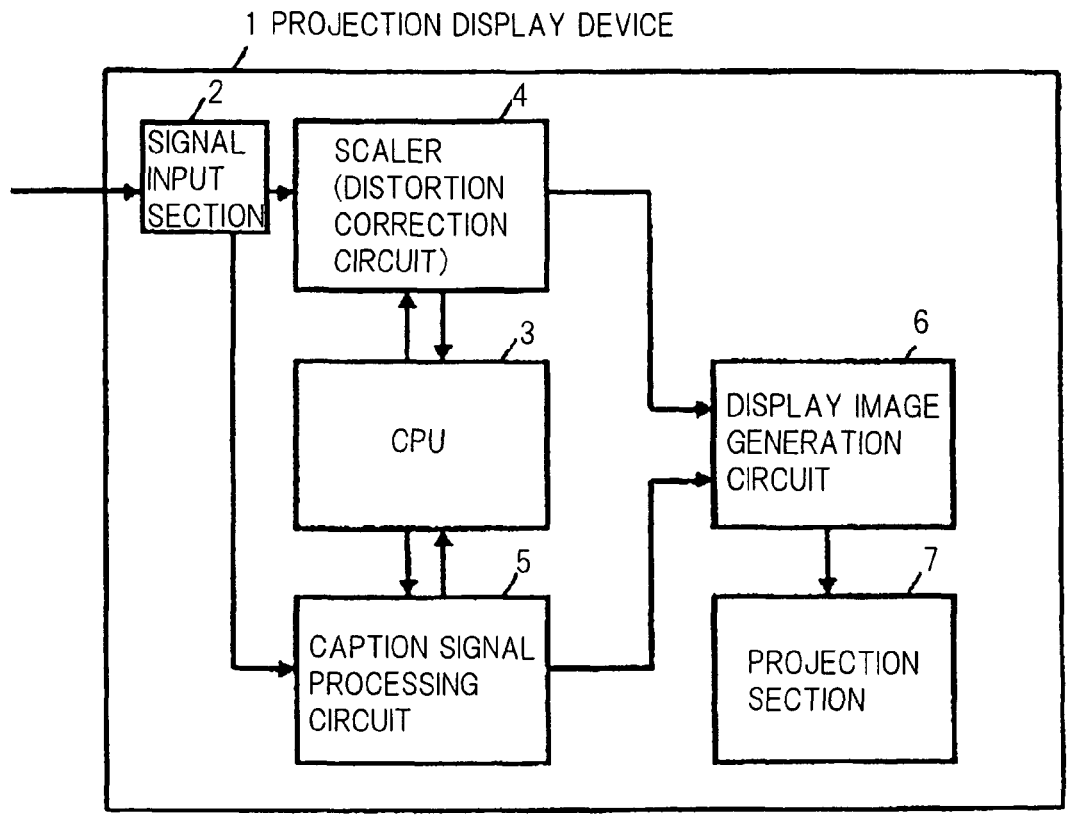
FIG. 1 is a block diagram showing the configuration of a projection display device according to a first exemplary embodiment.

FIG. 1 is a block diagram showing the configuration of a projection display device according to a first exemplary embodiment.

In FIG. 1, projection display device 1 includes signal input section 2, CPU 3, scaler (distortion correction circuit) 4, caption signal processing circuit 5, display image generation circuit 6, and projection section 7.

Signal input section 2 receives an image signal and a caption signal. The caption signal contains text information. Furthermore, the caption signal may contain additional meta information on the caption signal. The meta information is, for example, area information indicative of the display area of the caption.

CPU 3 is an example of control means. CPU 3 determines the correction amount required to correct the image signal for distortion. Here, CPU 3 may determine the correction amount based on inclination angles measured by any of various sensors such as an acceleration sensor and an optical sensor or may use a correction amount set by a user. The inclination angle is the angle of the projecting optical axis of projection display device 1 with respect to each of the vertical and horizontal directions.

The correction amount is information indicative of the display area of an image based on the image signal corrected for distortion. The correction amount includes, for example, a horizontal compression rate for each vertical position in the image signal and a vertical compression rate for each horizontal position in the image signal. Alternatively, the correction amount may include the difference, for each vertical position in the image signal, between a horizontal angle of view in the uncorrected image signal and a horizontal angle of view in the corrected image and the difference, for each horizontal position in the image signal, between a vertical angle of view in the uncorrected image signal and a vertical angle of view in the corrected image.

For example, if the projection display device 1 is installed with the projecting optical axis upward, a projected image corresponding to the image signal is shaped like an inverted trapezoid (a trapezoid with an upper base longer than a lower base). In this case, the horizontal compression rate for the image signal is highest at the upper base of the image and decreases gradually toward the lower base. Furthermore, the horizontal compression rate for the image signal is constant.

Scaler 4 is an example of correction means. Scaler 4 corrects the image signal for distortion based on the correction amount determined by CPU 3.

Caption signal processing circuit 5 is an example of processing means. Caption signal processing circuit 5 adjusts the display content of the caption signal based on the correction amount determined by CPU 3 so that the entire caption indicated by the caption signal is displayed. The display content of the caption signal is, for example, the display area of the caption indicated by the caption signal and a display method for the caption signal.

For example, caption signal processing circuit 5 calculates the difference, between the uncorrected image signal and the corrected image signal, in the coordinates of the reference point in the display area indicated by area information additionally contained in the caption signal. Caption signal processing circuit 5 adjusts the position of the display area by an amount corresponding to the difference. Caption signal processing circuit 5 may hold area information indicative of the display area of the unadjusted caption signal.

Subsequently, caption signal processing circuit 5 adjusts the size of the display area based on the correction amount. For example, the caption signal processing circuit 5 adjusts the horizontal size of the display area so that the horizontal length of the display area decreases with the increasing horizontal compression rate for the vertical position of the reference point.

Furthermore, caption signal processing circuit 5 adjust the caption signal so that the entire caption is placed inside the adjusted display area.

Specifically, caption signal processing circuit 5 first adjust the position of the caption. First, caption signal processing circuit 5 adjusts the caption signal so that the reference caption position of the caption coincides with a predetermined position in the display area. The reference caption position is, for example, the central position of the caption. The predetermined position is the central position of the display area.

Subsequently, caption signal processing circuit 5 checks whether or not the entire caption is placed inside the adjusted display area. When at least part of the caption fails to be placed inside the adjusted display area, caption signal processing circuit 5 adjusts the caption signal so as to display the caption in a plurality of lines or to scroll the caption.

Display image generation circuit 6 is an example of synthesis means. Display image generation circuit 6 synthesize the caption signal with the display content thereof adjusted by caption signal processing circuit 5, with the image signal corrected by scaler 4.

Projection section 7 projects the image signal synthesized by display image generation circuit 6.

Now, a projected image will be described.

Figure 2:
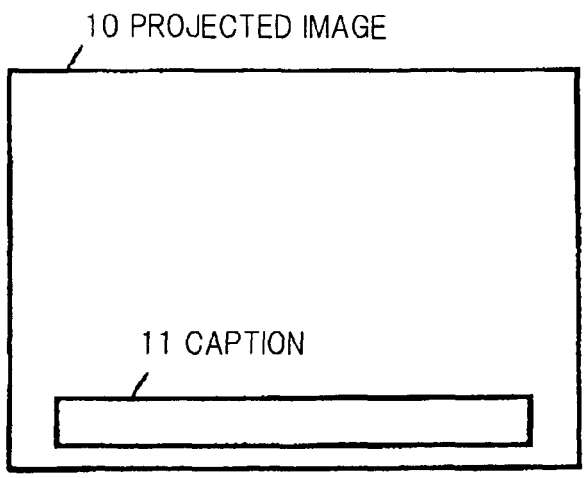
FIG. 2 is a diagram illustrating an example of a projected image.

FIG. 2 is a diagram illustrating a projected image for which the image signal need not be corrected for distortion. In FIG. 2, projected image 10 contains caption 11. Here, caption 11 is located inside projected image 10.

Figure 3:
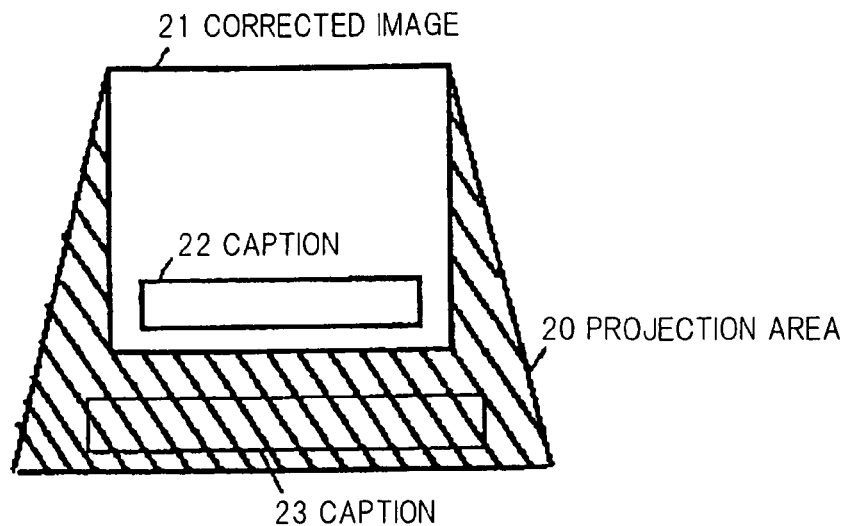
FIG. 3 is a diagram showing another example of a projected image.

FIG. 3 is a diagram illustrating a projected image corrected for distortion. In FIG. 3, projection area 20 shows an area in which the projected image is projected if the distortion fails to be corrected. With the image signal corrected for distortion, the projected image is displayed as corrected image 21 corrected for distortion.

If the display content of the caption fails to be adjusted, the caption is misaligned with corrected image 21 and displayed like caption 23. Caption signal processing circuit 5 adjusts the display content of the caption so that the caption is displayed as caption 22.

Now, the operation will be described.

Figure 4:
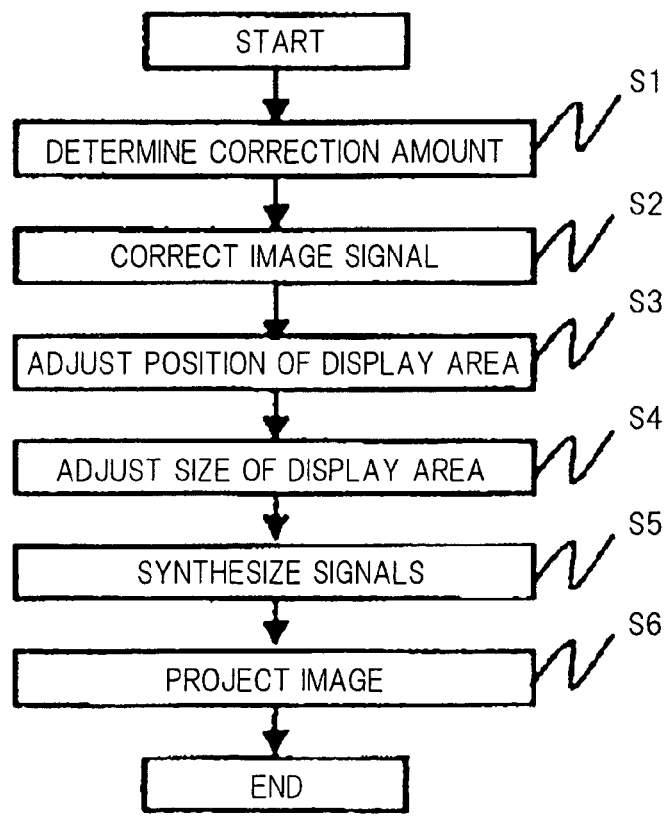
FIG. 4 is a flowchart illustrating an example of operation of a projection display device according to a second exemplary embodiment.

FIG. 4 is a flowchart illustrating an example of operation of projection display device 1.

In step S1, CPU 3 determines a correction amount and outputs the correction amount to scaler 4 and caption signal processing circuit 5. Scaler 4 receives and then sets the correction amount in scaler 4 itself. Furthermore, caption signal processing circuit 5 receives and then sets the correction amount in caption signal processing circuit 5 itself.

Thereafter, signal input section 2 receives an image signal and a caption signal and then executes step S2.

In step S2, signal input section 2 outputs the image signal to scaler 4, and outputs the caption signal to caption signal processing circuit 5.

Scaler 4 receives and then corrects the image signal for distortion based on the correction amount set in scaler 4 itself. Scaler 4 outputs the corrected image signal to display image generation circuit 6.

Furthermore, upon receiving the caption signal, caption signal processing circuit 5 executes step S3.

In step S3, caption signal processing circuit 5 calculates the difference in the coordinates of the reference point in the display area between the uncorrected image and the corrected image based on the correction amount set in caption signal processing circuit 5. Caption signal processing circuit 5 adjusts the position of the display area by an amount corresponding to the difference. After adjusting the position of the display area, caption signal processing circuit 5 executes step S4.

In step S4, caption signal processing circuit 5 adjusts the size of the display area based on the correction amount. For example, caption signal processing circuit 5 adjusts the horizontal size of the display area so that the horizontal length of the display area decreases with the increasing horizontal compression rate for the vertical position of the reference point. After adjusting the size of the display area, caption signal processing circuit 5 executes step S5.

In step S5, caption signal processing circuit 5 adjusts the caption signal so that the caption is placed inside the adjusted display area. Caption signal processing circuit 5 then outputs the adjusted caption signal to display image generation circuit 6.

Upon receiving the image signal output in step S2 and the caption signal output in step S5, display image generation circuit 6 executes step S6.

In step S6, display image generation circuit 6 synthesizes the caption signal with the image signal. Display image generation circuit 6 then outputs the resulting image signal to projection section 7. Upon receiving the image signal, projection section 7 executes step S7.

In step S7, projection section 7 operates in accordance with the image signal to project the image corresponding to the image signal.

Now, effects will be described.

According to the present exemplary embodiment, CPU 3 determines the correction amount required to correct the image signal for distortion. Scaler 4 corrects the image signal for distortion based on the correction amount. Based on the correction amount, caption signal processing circuit 5 adjusts the display content of the caption signal so that all of the caption indicated by the caption signal is displayed. Display image generation circuit 6 synthesizes the caption signal with the display content thereof adjusted, with the image signal corrected by scaler 4. Projection section 7 projects the synthesize image signal.

In this case, the display content of the caption is adjusted based on the correction amount required to correct the image for distortion so that all of the caption is displayed. Thus, the same correction amount is used to correct both the projected image and the caption for distortion. Hence, the caption is reliably placed inside the projected image and can be displayed without any dropout.

Now, a second exemplary embodiment will be described.

Figures 5, 6:
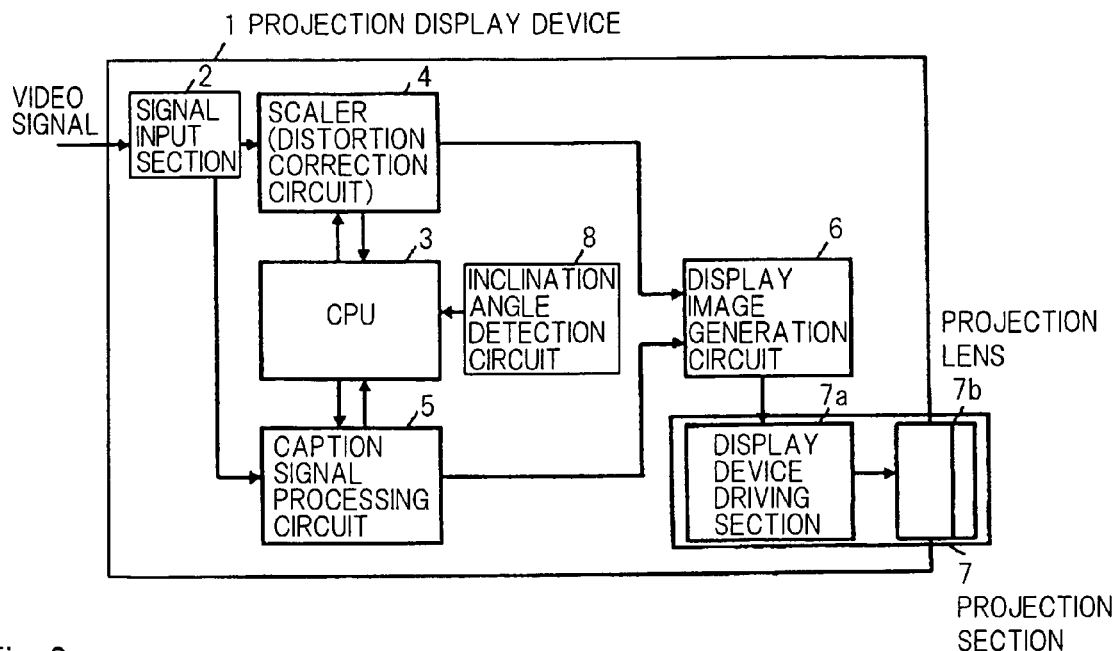
FIG. 5 is a block diagram showing the configuration of a projection display device according to a second exemplary embodiment.
FIG. 6 is a diagram illustrating an example of a caption.

FIG. 5 is a block diagram showing a projection display device according to a second exemplary embodiment. In FIG. 5, components having the same functions as those of the corresponding components in FIG. 1 are denoted by the same reference numerals as those of the corresponding components. Description of these functions may be omitted.

In FIG. 5, projection display device 1 includes inclination angle detection circuit 8 in addition to the configuration shown in FIG. 1. Furthermore, projection section 7 includes display device driving section 7a and projection lens 7b.

Signal input section 2 receives a video signal. The video signal includes an image signal and a caption signal.

Inclination angle detection circuit 8 includes an acceleration sensor or an optical sensor to determine an inclination angle to each of the horizontal and vertical directions of the projecting optical axis of projection display device 1.

For example, inclination angle detection circuit 8 includes a plurality of optical detection elements arranged linearly in the vertical and horizontal directions of the projection axis of a video. In this case, projection section 7 projects a video image with a uniform luminance on the screen. Inclination angle detection circuit 8 allows the optical detection elements to detect the illuminance level of reflected light from the screen. Thus, inclination angle detection circuit 8 determines the centroid of the illuminance level. Inclination angle detection circuit 8 holds information indicative of the correlation between the centroid of the illuminance level and the inclination angles. Based on the information, inclination angle detection circuit 8 determines the inclination angles corresponding to the determined centroid of the illuminance level to be the inclination angles of the projecting optical axis of projection display device 1 with respect to the horizontal and vertical directions.

CPU 3 determines the correction amount based on the inclination angles determined by inclination angle detection circuit 8. CPU 3 records information indicative of the correlation between the correction amount and the inclination angles, in a recording section such as a memory (not shown in the drawings). Based on the information, CPU 3 determines the correction amount corresponding to the inclination angles determined by inclination angle detection circuit 8, to be the correction amount required to correct the image signal for distortion.

Caption signal processing circuit 5 adjusts the position and size of the display area based on the correction amount determined by CPU 3.

Furthermore, caption signal processing circuit 5 determines the appropriate font size for the characters in the caption based on the correction amount determined by CPU 3. For example, caption signal processing circuit 5 holds information indicative of the correlation between the correction amount and the font size. Based on the information, caption signal processing circuit 5 determines the font size corresponding to the correction amount determined by CPU 3 to be the appropriate font size for the characters in the caption.

Furthermore, caption signal processing circuit 5 determines the maximum number of characters that can be placed inside the adjusted display area per caption line. For example, caption signal processing circuit 5 determines the horizontal length of the adjusted display area. Subsequently, the caption signal processing circuit uses the font size of the characters in the caption or the length between the characters to determine the maximum number of characters that can be placed within the horizontal length per caption line. The length between the characters may be specified for each font size or may be constant.

Caption signal processing circuit 5 adjusts the caption signal so that the number of characters displayed per caption line is equal to or smaller than the maximum value.

Specifically, caption signal processing circuit 5 determines the number of characters in the caption based on the caption signal. Caption signal processing circuit 5 determines whether or not the number of characters in the caption is larger than the maximum value. If the number of characters in the caption is larger than the maximum value, caption signal processing circuit 5 adjusts the caption signal so that the number of characters displayed per caption line is equal to or smaller than the maximum value.

For example, caption signal processing circuit 5 adjusts the caption signal so that the caption is displayed in a plurality of lines. Furthermore, caption signal processing circuit 5 adjusts the caption signal so as to allow the caption to be scrolled. Here, a scroll direction, a scroll speed, and the presence or absence of a loop display may be preset or set by a user.

FIG. 6 is a diagram illustrating an example of a caption.

Caption 31 corresponds to an image signal uncorrected for distortion. In caption 31, 26 characters from A to Z are displayed in one line.

It is assumed that the image signal is corrected for distortion and that the display area is adjusted. In this case, it is assumed that the maximum number of characters that can be placed inside the adjusted display area is 13.

Captions 32 and 33 correspond to the image signal corrected for distortion. Specifically, caption 32 is displayed in a plurality of lines. Caption 33 is displayed by scrolling.

In caption 32, A to Z are displayed in two lines with the first line ending with the 13th character M. Caption 33 is scrolled with A to Z from right to left.

Referring back to FIG. 5, display device driving section 7a drives the display device in accordance with the image signal synthesized by display image generation circuit 6. Display device driving section 7a projects the image corresponding to the image signal via projection lens 7b.

Now, operations will be described.

Figure 7:
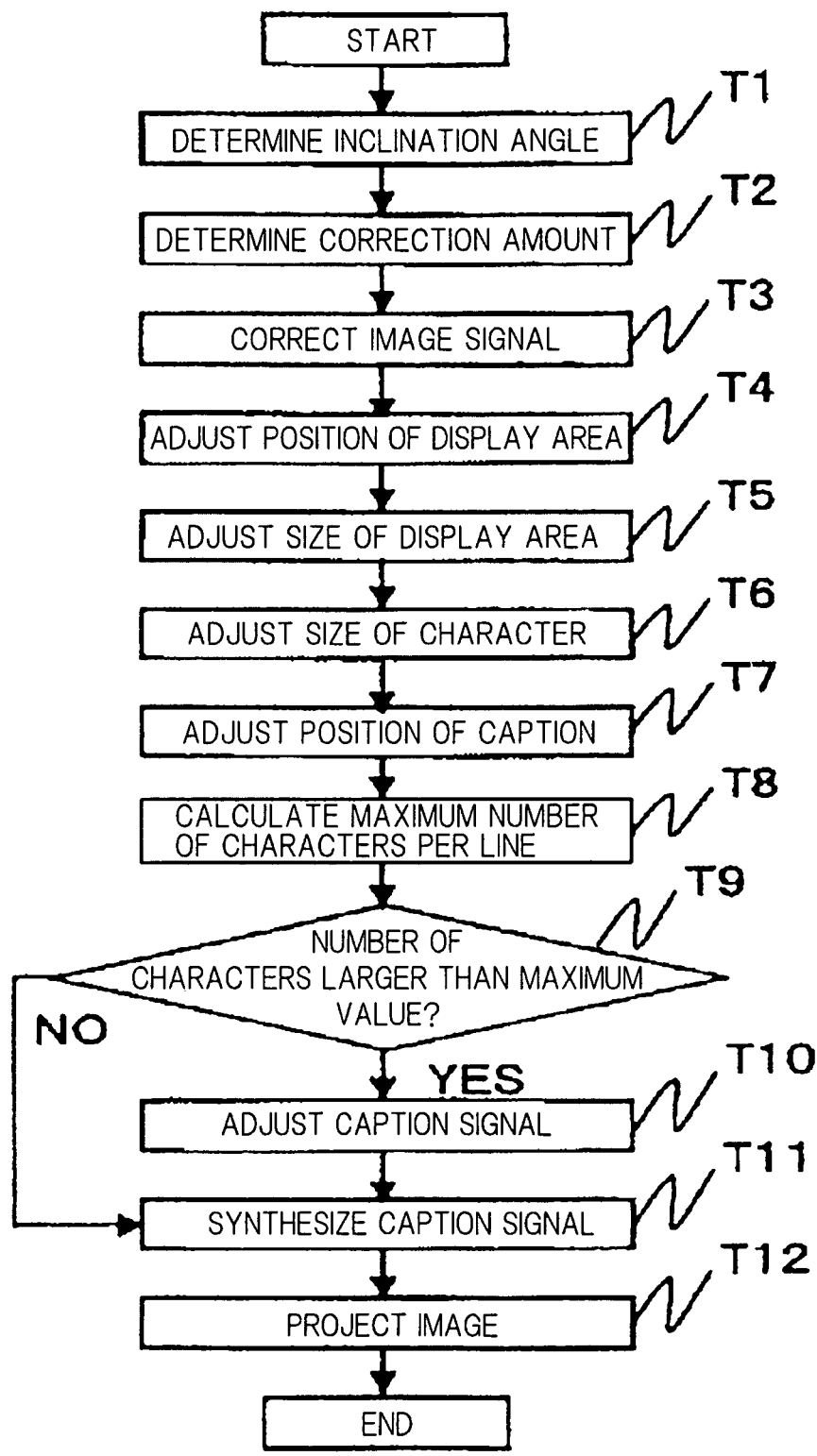
FIG. 7 is a flowchart illustrating an example of operation of the projection display device according to the second exemplary embodiment.

FIG. 7 is a flowchart illustrating the operation of projection display device 1 according to the present exemplary embodiment.

In step T1, inclination angle detection circuit 8 determines the inclination angle of the projecting optical axis of projection display device 1 with respect to the vertical direction. Inclination angle detection circuit 8 then outputs the inclination angle to CPU 3. Upon receiving the inclination angle, CPU 3 executes step T2.

In step T2, based on the inclination angle, CPU 3 determines the correction amount required to correct the image signal for distortion. Here, CPU 3 is assumed to determine a horizontal compression rate for each vertical position in the image signal and a vertical compression rate for each horizontal position in the image signal.

CPU 3 determines and then outputs the correction amount to scaler 4 and caption signal processing circuit 5. Scaler 4 receives and then sets the correction amount in scaler 4 itself. Furthermore, caption signal processing circuit 5 receives and then sets the correction amount in caption signal processing circuit 5 itself.

Thereafter, signal input section 2 receives a video signal and then executes step T3.

In step T3, signal input section 2 outputs the video signal to scaler 4 and caption signal processing circuit 5.

Upon receiving the video signal, scaler 4 extracts an image signal from the video signal. Scaler 4 corrects the image signal for distortion based on the set correction amount. Scaler 4 then outputs the corrected image signal to display image generation circuit 6. Display image generation circuit 6 receives the image signal.

Furthermore, upon receiving the video signal, caption signal processing circuit 5 executes step T4.

In step T4, caption signal processing circuit 5 extracts a caption signal from the video. Furthermore, caption signal processing circuit 5 adjusts the position of the display area based on the correction amount set in caption signal processing circuit 5 itself. After adjusting the position of the display area, caption signal processing circuit 5 executes step T5.

In step T5, caption signal processing circuit 5 adjusts the size of the display area based on the correction amount. After adjusting the size of the display area, caption signal processing circuit 5 executes step T6.

In step T6, caption signal processing circuit 5 determines the appropriate font size for the characters in the caption based on the correction amount. Caption signal processing circuit 5 then adjusts the caption signal so that the characters in the caption have the determined font size. After finishing step T6, caption signal processing circuit 5 executes step T7.

In step T7, caption signal processing circuit 5 adjusts the caption signal so that a reference caption position in the caption coincides with a predetermined position in the display area. After finishing step T7, caption signal processing circuit 5 executes step T8.

In step T8, caption signal processing circuit 5 determines the horizontal length of the adjusted display area. Caption signal processing circuit 5 uses the font size of the characters in the caption or the length between the characters to determine the maximum number of characters that can be placed within the horizontal length per caption line.

After determining the maximum number of characters, caption signal processing circuit 5 executes step T9.

In step T9, caption signal processing circuit 5 determines the number of characters based on the caption signal. Caption signal processing circuit 5 then determines whether or not the number of characters in the caption is larger than the maximum value. If the number of characters in the caption is larger than the maximum value, caption signal processing circuit 5 executes step T10. If the number of characters in the caption is equal to or smaller than the maximum value, caption signal processing circuit 5 executes step T11.

In step T10, caption signal processing circuit 5 processes the caption signal so that the caption is placed inside the adjusted display area.

For example, to allow the caption to be displayed in a plurality of lines, caption signal processing circuit 5 processes the caption signal so that the caption is displayed in a plurality of lines with a new line position set to correspond to the maximum number of characters. At this time, caption signal processing circuit 5 readjusts the display area of the caption in the vertical direction in accordance with the number of lines in the caption. For example, caption signal processing circuit 5 extends the display area in the vertical direction by a value corresponding to the number of lines.

Furthermore, to allow the caption to be scrolled, caption signal processing circuit 5 processes the caption signal so that the caption is scrolled in such a manner that the number of characters displayed at a time is equal to or smaller than the maximum value.

After finishing step T10, caption signal processing circuit 5 executes step T11.

In step T11, caption signal processing circuit 5 outputs the caption signal to display image generation circuit 6.

Display image generation circuit 6 receives and then synthesizes the caption signal with the image signal received in step T3. Display image generation circuit 6 then outputs the synthesized image signal to display device driving section 7a. Upon receiving the image signal, display device driving section 7a executes step T12.

In step T12, display device driving section 7a drives the display device in accordance with the image signal. Display device driving section 7a projects the image corresponding to the image signal, via projection lens 7b.

Now, effects will be described.

According to the present exemplary embodiment, caption signal processing circuit 5 determines the maximum number of characters that can be placed inside the adjusted display area per caption line. Furthermore, caption signal processing circuit 5 adjusts the caption signal so that the number of characters displayed per caption line is equal to or smaller than the maximum value.

In this case, the caption signal is adjusted so that the number of characters displayed per caption line is equal to or smaller than the maximum value. Thus, the caption can be placed inside the adjusted display area without the need to change the font size for the caption or the length between the characters. Therefore, the caption can be placed inside the adjusted display area so as to be seen easily.

Furthermore, in the present exemplary embodiment, if the number of characters in the caption is larger than the maximum value, caption signal processing circuit 5 adjusts the caption signal so that the caption is displayed in a plurality of lines.

In this case, the caption is displayed in a plurality of lines. Thus, all of the caption can be displayed at a time.

Furthermore, if the number of characters in the caption is larger than the maximum value, caption signal processing circuit 5 adjusts the caption signal so as to allow the caption to be scrolled.

In this case, the caption is scrolled. Thus, enlargement of the display area of the caption can be suppressed.

Additionally, scaler 4, display image generation circuit 6, and projection section 7 according to the present invention are each of a conventional type. Thus, an increase in the cost to display the caption without a dropout can be suppressed.

In the above-described exemplary embodiments, the illustrated configurations are only illustrative. The present invention is not limited to the configurations. Various changes understandable to those skilled in the art within the scope of the present invention can be made to the configurations and details of the present invention.

The present application claims priority based on Japanese Patent Application No. 2008-014798 filed on Jan. 25, 2008 and incorporates the entirety of the disclosure thereof herein.

The invention claimed is:

1. A projection display device which projects an image, comprising:
    a signal input section that receives an image signal and a caption signal;
    a controller that determines a trapezoidal distortion correction amount, including a horizontal compression rate for each vertical position in the image signal and a vertical compression rate for each horizontal position in the image signal, that corrects a trapezoidal distortion of the image that is projected;
    a correction section that corrects said image signal for distortion based on said trapezoidal distortion correction amount determined by said controller;
    a processor that adjusts a size of a display area of said caption signal based on said trapezoidal distortion correction amount determined by said controller in such a manner that an entire caption indicated by said caption signal is displayed and determines a maximum number of characters successfully placed inside said adjusted display area per caption line, and if a number of characters in said caption is more than said maximum number, said processor adjusts said caption signal such that said number of characters displayed per caption line is equal to or less than said maximum number;
    a synthesizer that synthesizes said caption signal with said display content thereof adjusted by said processor, with said image signal corrected by said correction section; and
    a projection section that projects an image corresponding to said image signal synthesized by said synthesizer.

2. The projection display device according to claim 1, wherein, if said number of characters in said caption is more than said maximum number, said processor adjusts said caption signal so that said caption is displayed in a plurality of lines.

3. The projection display device according to claim 1, wherein, if said number of characters in said caption is more than said maximum number, said processor adjusts said caption signal so as to allow said caption to be scrolled.

4. The projection display device according to claim 1, wherein the maximum number of characters is determined based on a size of an area which displays the characters.

5. The projection display device according to claim 1, wherein the controller determines a difference between an uncorrected image signal and a corrected image signal, in coordinates of a reference point in the display area indicated by area information included in said caption signal.

6. The projection display device according to claim 5, wherein said processor adjusts a position of the display area based on said difference between the uncorrected image signal and the corrected image signal.

7. The projection display device according to claim 5, wherein said processor adjusts a horizontal size of the display area such that a horizontal length of the display area decreases with increasing a horizontal compression rate of a vertical position of the reference point.

8. The projection display device according to claim 1, wherein the processor adjusts a horizontal size of the display area such that a horizontal length of the display area decreases with increasing the horizontal compression rate.

9. The projection display device according to claim 1, wherein the entire caption indicated by said caption signal is displayed inside the display area that is adjusted by the processor.

10. The projection display device according to claim 1, wherein the processor adjusts the caption signal such that a reference caption position of said caption coincides with a predetermined position in the display area.

11. The projection display device according to claim 1, wherein the reference caption position of said caption includes a central position of said caption, and the predetermined position includes a central position of the display area.

12. A caption display method, comprising:
    receiving an image signal and a caption signal;
    determining a trapezoidal distortion correction amount, including a horizontal compression rate for each vertical position in the image signal and a vertical compression rate for each horizontal position in the image signal, that corrects a trapezoidal distortion of an image that is projected;
    correcting said image signal for distortion based on said determined trapezoidal distortion correction amount;
    adjusting a size of a display area of said caption signal based on said determined trapezoidal distortion correction amount in the image signal in such a manner that an entire caption indicated by said caption signal is displayed;

determining a maximum number of characters successfully placed inside said adjusted display area per caption line;

if said number of characters in said caption is more than said maximum number, adjusting said caption signal such that said number of characters displayed per caption line is equal to or less than said maximum number;

synthesizing said caption signal with said display content thereof adjusted, with said corrected image signal; and projecting an image corresponding to said synthesized image signal.

13. The caption display method according to claim 12, wherein, if said number of characters in said caption is more than said maximum number, said caption signal is adjusted so that said caption is displayed in a plurality of lines.

14. The caption display method according to claim 13, wherein, if said number of characters in said caption is more than said maximum number, said caption signal is adjusted so as to allow said caption to be scrolled.

15. The caption display method according to claim 12, wherein the maximum number of characters is determined based on a size of an area which displays the characters.

16. The caption display method according to claim 12, wherein said determining the trapezoidal distortion correction amount comprises determining a difference between an uncorrected image signal and a corrected image signal, in coordinates of a reference point in the display area indicated by area information included in said caption signal.

17. The caption display method according to claim 16, wherein said adjusting the size of the display area comprises adjusting a position of the display area based on said difference between the uncorrected image signal and the corrected image signal.

18. The caption display method according to claim 16, wherein said adjusting the size of the display area comprises adjusting a horizontal size of the display area such that a horizontal length of the display area decreases with increasing a horizontal compression rate of a vertical position of the reference point.

* * * * *